US012587798B2

(12) United States Patent
Lau et al.

(10) Patent No.: US 12,587,798 B2
(45) Date of Patent: Mar. 24, 2026

(54) HEADPHONES WITH SOUND-ENHANCEMENT AND INTEGRATED SELF-ADMINISTERED HEARING TEST

(71) Applicant: Alex Lau, Hong Kong (HK)

(72) Inventors: Alex Lau, Hong Kong (HK); Pui Tong Paul Lee, Hong Kong (HK)

(73) Assignee: Alex Lau, Hong Kong (HK)

( * ) Notice: Subject to any disclaimer, the term of this patent is extended or adjusted under 35 U.S.C. 154(b) by 240 days.

(21) Appl. No.: 18/469,616

(22) Filed: Sep. 19, 2023

(65) Prior Publication Data

US 2024/0107248 A1 Mar. 28, 2024

Related U.S. Application Data

(60) Provisional application No. 63/409,038, filed on Sep. 22, 2022.

(51) Int. Cl.
*H04R 29/00* (2006.01)

(52) U.S. Cl.
CPC .................................. *H04R 29/001* (2013.01)

(58) Field of Classification Search
CPC ........................... H04R 29/001; H04R 1/1083; H04R 2225/39; H04R 2225/41; H04R 25/70; H04R 25/507
USPC ............................................ 381/58, 60, 314
See application file for complete search history.

(56) References Cited

U.S. PATENT DOCUMENTS 7,181,297 B1 2/2007 Pluvinage et al.
9,138,178 B2 9/2015 Lee et al.
9,468,401 B2 10/2016 Van Hasselt et al.
9,584,920 B2 2/2017 Lee et al.
9,782,131 B2 10/2017 Van Hasselt et al.
10,356,535 B2 7/2019 Van Hasselt et al.
10,997,970 B1 5/2021 Rafii
2011/0137111 A1 6/2011 Hanley et al.
2014/0314261 A1 10/2014 Selig et al.
2016/0249126 A1* 8/2016 Konjeti ................ H04R 1/1091

(Continued)

FOREIGN PATENT DOCUMENTS

CN 1589588 A 3/2005
CN 104937954 A 9/2015

(Continued)

OTHER PUBLICATIONS

International Search Report and Written Opinion of corresponding PCT application No. PCT/CN2023/119868 mailed on Dec. 25, 2023.

*Primary Examiner* — Duc Nguyen
*Assistant Examiner* — Chimezie Ezeriwe Bekee
(74) *Attorney, Agent, or Firm* — Idea Intellectual Limited; Sam T. Yip

(57) ABSTRACT

The present invention provides a self-contained headphone that simplifies the process of self-administered hearing tests in audiological profiling for sound enhancement; a specially-configured computing device that allows interoperability with headphones/speakers and other transducer components of any make and model, yet capable of audiological profiling for sound enhancement; and the machine learning-based classifiers for predicting audiological profiles and audio settings for a listener using her personal traits, the listening conditions, and the listening contents, without the need for first conducting any hearing test.

11 Claims, 3 Drawing Sheets

(56) References Cited

U.S. PATENT DOCUMENTS

| | | | |
|---|---|---|---|
| 2018/0035216 | A1 | 2/2018 | Van Hasselt et al. |
| 2020/0066264 | A1* | 2/2020 | Kwatra .................... G10L 25/63 |
| 2021/0168535 | A1* | 6/2021 | Schoen .................. H04R 25/70 |
| 2021/0185465 | A1 | 6/2021 | Bramsløw |
| 2021/0227338 | A1 | 7/2021 | Abdallah Abdelrehim Abokela et al. |
| 2021/0349683 | A1* | 11/2021 | Cremer .................... G10L 25/51 |
| 2022/0046419 | A1* | 2/2022 | Marquardt .......... H04W 12/084 |
| 2022/0174395 | A1* | 6/2022 | Marti ............... G10K 11/17823 |

FOREIGN PATENT DOCUMENTS

| | | | |
|---|---|---|---|
| CN | 106037755 | A | 10/2016 |
| CN | 106062746 | A | 10/2016 |
| CN | 106659435 | A | 5/2017 |
| CN | 107708046 | A | 2/2018 |

* cited by examiner

HEADPHONES WITH SOUND-ENHANCEMENT AND INTEGRATED SELF-ADMINISTERED HEARING TEST

CROSS REFERENCE WITH RELATED APPLICATIONS

This application claims priority to the U.S. Provisional Utility Patent Application No. 63/409,038 filed Sep. 22, 2022; the disclosure of which is incorporate herein by reference in its entirety.

FIELD OF THE INVENTION

This invention is directed in general to the field of audiology and digital sound engineering and in particular to audio transducers that allow sound enhancement by customization using personalized audiological profile.

BACKGROUND

Hearing loss has been estimated to be the most prevalent disability in developed countries. The decreased hearing capability may be due to several factors, including age, health, occupation, injury, and disease. Although literally millions of people worldwide suffer from various level of hearing deficiency, many of whom are unaware of their hearing loss.

In general, hearing sensitivity to high-pitched sound tends to lessen first, but people seldom are aware of the degradations in their hearing sensitivities until they experience hearing problems. For people with hearing deterioration, their hearing capabilities are generally sufficient for most listening situations. Since the impact of their hearing loss is tolerable, they tend to ignore or work around it, such as avoiding talking on the phone in noisy environments, without seeking help from healthcare professionals.

For individuals with significant hearing loss, they may consult hearing healthcare professionals to be prescribed and procure hearing aids, Although wearing a hearing aid is considered as one of the less intrusive assistive techniques for hearing loss patients, it is not without problems. To use a hearing aid during a phone conversation or music enjoyment via headphones is clumsy and inconvenient. For example, people using hearing aids often experience feedback, which is the squeal created by the hearing aid output sound being picked up by the hearing aid microphone.

Another common problem associated with hearing loss is tinnitus. Tinnitus is a conscious experience of sound that originates in the head (i.e., without an external acoustic source) and may be manifest by an evident audible ringing that interferes with other sounds around one or more frequencies as perceived by the hearer. Tinnitus is a common condition and a symptom normally observed with age-related hearing loss. Tinnitus is known to affect individuals to varying degrees and in a great number of different ways. Some people with chronic tinnitus are able to ignore the condition while others find it annoying, intrusive, distracting, and even disabling. Tinnitus may interfere with sleep, causing both emotional distress and other ill-effects on general health.

Many tinnitus sufferers notice that their tinnitus changes in different acoustic surroundings. Typically, it is more bothersome in a silent environment, but less annoying in sound-enriched environments. This has led to the development of sound therapies for tinnitus treatment. The most common recommendation is to "avoid silence" by enriching the ambient sound. This can be accomplished by simply playing some background sound or music. More sophisticated sound therapies involve measuring the pitch and loudness of the tinnitus signals and providing signals at various hearing-levels.

Besides procuring hearing aids and treatments to combat the various types and degrees of hearing loss, sound enhancement techniques have been developed to enrich the hearing experience of people, whether they are suffering hearing loss or not. One such sound enhancement techniques is audiological profiling. The audiological profile obtained is personalized to the listener's hearing capability and preference. The personalized audiological profile is then used to set the various audio playback and sound amplification parameters in an audio device, such as a hearing aid, an audio amplifier, a digital audio player, a smart phone, or the like that are capable of receiving the personalized audiological profile and modifying the audio signal generated accordingly.

During the audiological profiling of a subject listener, the minimum audible hearing levels perceived for a set of audiometric frequencies (thresholds) are measured. Various methods are known for obtaining the thresholds; however, even in cases where the procedures are simplified enough for self-administration, usually a calibrated hearing test device in a controlled and quiet testing environment is needed to facilitate the self-administered hearing test.

In order for a hearing test device to produce a specific sound wave amplitude as a test tone, the device and its transducer combination (the audio signal generation circuitry path) requires calibration. The reason for this is that the circuitry and transducer or headphone/speaker of each device have different frequency responses that influence the output amplitude of sound waves. This means the same electric audio signal will result in different amplitudes of sound waves for devices and headphones of different models.

Further, it was found that when using different headphones/speakers with the same audiological profile and audio playback system differ slightly in their sound enhancements. The differences are due to the different frequency responses of the headphone/speaker's transducer compared with the transducer of the headphone/speaker for which the system was calibrated.

Background ambient noise also affects the individual abilities to perceive or understand the acoustic signals. This is due to the "masking effect" of the background ambient noise. If the environment noise is analyzed and then taken into account during audio signal enhancement, this can further enhance the hearing experience of the listener.

By taking into account both the transducer effect and the environment, additional information/data may be collected and stored aside from the threshold values obtained to complete the personalized audiological profile. This personalized audiological profile is then specific to the audio device and headphone/speaker used, as well as the environment noise composition at the time of the hearing test. The transducer characteristics can even be determined by the subject listener indicating to the system the brand/model of the audio device and headphone/speaker, or by automatic system detection before undergoing the self-administered hearing test. The environment noise can be separately sampled and analyzed during the test.

Details of the aforesaid audiological profiling with self-administered hearing test and device calibration for sound enhancement are disclosed in U.S. Pat. Nos. 9,138,178;

9,468,401; 9,584,920; 9,782,131; and 10,356,535; the disclosures of which are incorporated herein by reference in their entirety.

Despite the benefits offered by audiological profiling with self-administered hearing test, it has not yet widely adopted by the mass market. Part of the reasons is the shortcomings of the currently available systems. These include the need for separate hearing test device or software application during audiological profiling; insufficient ease of use, particularly in the operation of the self-administered hearing test itself; and the need for repeated hearing tests and audiological profile generations whenever the listening environment and/or the audio equipment changes. Therefore, there is an unmet need in the art to overcome these shortcomings.

SUMMARY OF THE INVENTION

It is an objective of the present invention to address the aforementioned shortcomings in the current state of the art by providing a self-contained headphone having sound enhancement and integrated self-administered hearing test; and a system and a method obtaining various audiological profiles suitable for different listeners under different audio listening conditions without repeated hearing tests.

Specifically, embodiments of the present invention involve capturing a subject listener's audio hearing characteristics to produce a personalized audiological profile; analyzing the personalized audiological profile; producing a processed result; and then automatically modifying the output signals from an audio reproduction apparatus to provide the subject listener with a processed result as a modified audio signal. Furthermore, the embodiments involve using artificial intelligence (AI) techniques in predicting the subject listener's audio hearing characteristics based on personal traits, usages, and audio listening conditions to generate a predicted audiological profile and audio settings for the subject listener.

In the various embodiments, a personalized audiological profile contains at least one or more of signal attenuation or gain values at one or more audiometric frequencies; and the processed result is a modified audio signal of an original input audio signal modified according to the personalized audiological profile.

According to one aspect of the invention, a self-contained headphone capable of sound enhancement by audiological profiling with integrated self-administered hearing test is provided. In one embodiment, the self-contained headphone comprises a number of user interface elements including buttons, sliders, and/or dials integrated with the headphones for facilitating a self-administered hearing test during audiological profiling of the subject listener. The self-contained headphone is configured to provide audio playback functions including play-pause control via built-in button press, track change control via built-in button press, volume control via built-in dial turning, equalizer control via built-in button presses and dial turning, and adjustable degrees of noise-cancellation.

In one embodiment, the self-contained headphone further comprises memory components for the storage and retrieval of audiological profiles. Calibration of the self-contained headphones is also conducted automatically during audiological profiling. Due to the nature of structural form of the headphones and the close proximity between transducers and ears, sound-proofing is inherently good and effect of environmental noise is minimized. Also due to the integrated sound enhancement circuitry and the transducers in the self-contained headphones, effect of varying frequency responses in the circuitry and transducer is also minimized.

According to another aspect of the present invention, portions or the entirety of the aforementioned functionalities of sound enhancement and self-administered hearing test are provided by a specially-configured computing device (i.e., a smartphone running an app executing the machine instructions implementing the functionalities of sound enhancement and self-administered hearing test) in place of the self-contained headphone. In such case, the specially-configured computing device is to couple with one or more headphones/speakers and/or other transducer components for audio signal generation.

In one embodiment, the headphones/speakers and/or other transducer components may be of any make and model. The calibration of the entire audio signal generation circuitry path and the self-administered hearing test can then be conducted using the specially-configured computing device executing the machine instructions implementing the calibration and self-administered hearing test such as a smartphone with a specially configured app or peripheral equipment. The specially-configured computing device further comprises an integrated user interface for facilitating the calibration and the self-administered hearing test to generate an audiological profile for the listener with the audio signal generation circuitry path, which is the combination of the specially-configured computing device and the particular headphones/speakers and/or other transducer components coupled to the specially-configured computing device. The specially-configured computing device then performs the sound enhancement on an input audio signal according to the generated audiological profile to generate a modified audio signal for the listener.

According to another aspect of the present invention, provided is a personal trait-based audiological profile classifier that may be implemented by one or more of neural networks that are commercially available The personal trait-based audiological profile classifier is configured to learn from labelled training data comprising records of a plurality of listeners' personal trait features including, but not limited to, age, gender, profession, education level, lifestyle, health condition; and their corresponding audiological profile data.

In one embodiment, the training data may be collected from the community of users of the self-contained headphones. In another embodiment, where a community of large number of users of the self-contained headphones may not be available or accessible, the training data may be collected from user groups of other audio devices capable of creating, using, and storing audiological profiles.

The trained personal trait-based audiological profile classifier is to classify a new listener, based on her personal traits provided in a request, and create or recommend an audiological profile without the need of the self-administered hearing test. The personal trait-based audiological profile classifier then responds to the requestor (i.e., the self-contained headphone or an audio device) the created/recommended audiological profile for the new listener.

In accordance with one implementation, the personal trait-based audiological profile classifier is executed by the processor of the self-contained headphone, or a separate processor associated with an audio device capable of processing audiological profile for sound enhancement such as a smartphone with a specially configured app or peripheral equipment. In another implementation, the personal trait-based audiological profile classifier is executed by a processor of a remote computing device accessible by the self-contained headphone and other audio devices capable of processing audiological profile for sound enhancement.

In accordance with one embodiment, the personal trait features and audiological profile data are stored in distributed ledger-based repositories, which may reside in the memories and be maintained by the processors of the self-contained headphones of the listeners. As such, the personal trait-based audiological profile classifier is configured to access the personal trait features and audiological profile data of users of the self-contained headphones as training data under secured distributed computing data exchange protocols. In another embodiment, the personal trait features and audiological profile data are stored in a specially-configured computing device accessible by the personal trait-based audiological profile classifiers of the self-contained headphones and/or other audio devices capable of processing audiological profile for sound enhancement.

According to yet another aspect, provided is a listening condition-based audiological profile classifier that may be implemented by one or more of neural networks. The listening condition-based audiological profile and audio settings classifier is configured to learn from labelled training data comprising records of a plurality of various listening condition features including, but not limited to, ambience noise levels; the corresponding environment types (i.e., on heavily travelled street, inside a moving passenger vehicle, in a windy open outdoor space, inside an indoor room hosting multiple conversations, in an underground train cabin, in an airplane cabin, etc.); the corresponding time and location data; the corresponding listeners' audio settings including, but not limited to, playback volume, equalizer settings, noise-cancellation level; the corresponding listeners' selections of audiological profile.

Similar to that of the personal trait-based audiological profile and audio settings classifier, in one embodiment, the training data for the listening condition-based audiological profile and audio settings classifier may be collected from the community of users of the self-contained headphones. In another embodiment, where a community of large number of users of the self-contained headphones may not be available or accessible, the training data may be collected from user groups of other audio devices capable of creating, using, and storing audiological profiles, and/or storing audio settings. In yet another embodiment, the listening condition-based audiological profile and audio settings classifier takes the listener's own selections of audiological profile and audio settings in the various listening conditions collected over a period of time as training data.

The trained listening condition-based audiological profile and audio settings classifier is to classify a new listening condition, based on the listener's user input specifying the environmental parameters (i.e., ambience noise level, etc.) or environment type, or by automatic detection of time and location in a request to the listening condition-based audiological profile and audio settings classifier; and create or recommend an audiological profile without the need of the self-administered hearing test, as well as the audio settings (prediction result). The listening condition-based audiological profile and audio settings classifier then responds to the requestor (i.e., the self-contained headphone or an audio device) the created/recommended audiological profile and audio settings for the new listening condition. As such, with the on-demand continuous responses from the listening condition-based audiological profile and audio settings classifier, the self-contained headphone or audio device as the requestor is able to continuously switch the audiological profiles and/or adjust the audio settings accordingly as its listener moves from one listening condition to another during run-time.

In accordance with one implementation, the listening condition-based audiological profile and audio settings classifier is executed by the processor of the self-contained headphone, or a separate processor associated with an audio device capable of processing audiological profile for sound enhancement such as a smartphone with a specially configured app or peripheral equipment. In another implementation, the listening condition-based audiological profile and audio settings classifier is executed by a processor of a remote computing device accessible by the self-contained headphone and other audio devices capable of processing audiological profile for sound enhancement.

In accordance with one embodiment, the listening condition features, audiological profile, and audio settings data are stored in distributed ledger-based repositories, which may reside in the memories and be maintained by the processors of the self-contained headphones of the listeners. As such, the listening condition-based audiological and audio settings profile classifier is configured to access the listening condition features, audiological profile, and audio settings data of users of the self-contained headphones as training data under secured distributed computing data exchange protocols. In another embodiment, these data are stored in a specially-configured computing device accessible by the listening condition-based audiological profile and audio settings classifiers of the self-contained headphones and/or other audio devices capable of processing audiological profile for sound enhancement.

According to yet another aspect of the present invention, provided is a listening content-based audiological profile and audio settings classifier that may be implemented by one or more of neural networks. The listening content-based audiological profile and audio settings classifier is configured to learn from labelled training data comprising records of a plurality of various listening content features including, but not limited to, playback track titles, listening content types (i.e., dialogs, music of different genres, motion pictures of different genres and moods of scenes, etc.); the corresponding listeners' audio settings including, but not limited to, playback volume, equalizer settings, noise-cancellation level; and the corresponding listeners' selections of audiological profile.

Similar to that of the listening condition-based audiological profile and audio settings classifier, in one embodiment, the training data for the listening content-based audiological profile and audio settings classifier may be collected from the community of users of the self-contained headphones. In another embodiment, where a community of large number of users of the self-contained headphones may not be available or accessible, the training data may be collected from user groups of other audio devices capable of creating, using, and storing audiological profiles, and/or storing audio settings. In yet another embodiment, the listening content-based audiological profile and audio settings classifier takes the listener's own selections of audiological profile and audio settings for the various listening contents collected over a period of time as training data.

The trained listening content-based audiological profile and audio settings classifier is to classify a new listening content, based on the listener's user input specifying the listening content type, or by automatic detection of the listening content types (i.e., via recognition of playback track titles and matching with an information database of tracks and their corresponding types) in a request to the listening content-based audiological profile and audio settings classifier; and create or recommend an audiological profile without the need of the self-administered hearing test, as well as the audio settings (prediction result). The listening content-based audiological profile and audio settings classifier then responds to the requestor (i.e., the self-contained headphone or an audio device) the created/recommended audiological profile and audio settings for the new listening content. As such, with the on-demand continuous responses from the listening content-based audiological profile and audio settings classifier, the self-contained headphone or audio device as the requestor is able to continuously switch the audiological profiles and/or adjust the audio settings accordingly as the listening content changes during run-time.

In accordance with one implementation, the listening content-based audiological profile and audio settings classifier is executed by the processor of the self-contained headphone, or a separate processor associated with an audio device capable of processing audiological profile for sound enhancement such as a smartphone with a specially configured app or peripheral equipment. In another implementation, the listening content-based audiological profile and audio settings classifier is executed by a processor of a remote computing device accessible by the self-contained headphone and other audio devices capable of processing audiological profile for sound enhancement.

In accordance with one embodiment, the listening content features, audiological profile, and audio settings data are stored in distributed ledger-based repositories, which may reside in the memories and be maintained by the processors of the self-contained headphones of the listeners. As such, the listening content-based audiological profile and audio settings classifier is configured to access the listening content features, audiological profile, and audio settings data of users of the self-contained headphones as training data under secured distributed computing data exchange protocols. In another embodiment, these data are stored in a specially-configured computing device accessible by the listening content-based audiological profile and audio settings classifiers of the self-contained headphones and/or other audio devices capable of processing audiological profile for sound enhancement.

According to yet another aspect of the present invention, provided is a prediction result merger configured to merge the prediction results from two or more of the personal traits-based audiological profile classifier, the listening condition-based audiological profile and audio settings classifier, and the listening content-based audiological profile and audio settings classifier. In one embodiment, the prediction result merger comprises a weighting sum sub-module for assigning one or more weights to each of the prediction results so to merge the prediction results under a weighted sum mechanism. The merged prediction result then comprises a merged audiological profile and merged audio settings used for the sound enhancement and audio setting configurations of the self-contained headphone and other audio devices capable of processing audiological profile for sound enhancement.

The various aspects and embodiments in accordance with the present invention, therefore, address the aforementioned shortcomings in the current state of the art by providing: 1.) a self-contained headphone that simplifies the process of self-administered hearing tests in audiological profiling for sound enhancement; 2.) a specially-configured computing device that allows interoperability with headphones/speakers and other transducer components of any make and model, yet capable of audiological profiling for sound enhancement; and 3.) ML-based classifiers for predicting audiological profiles and audio settings for a listener using her personal traits, the listening conditions, and the listening contents, without the need for first conducting hearing tests.

BRIEF DESCRIPTION OF DRAWINGS

Embodiments of the invention are described in more details hereinafter with reference to the drawings, in which.

DETAILED DESCRIPTION

In the following description, apparatuses and methods for audio signal generation, sound enhancement by audiological profiling and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
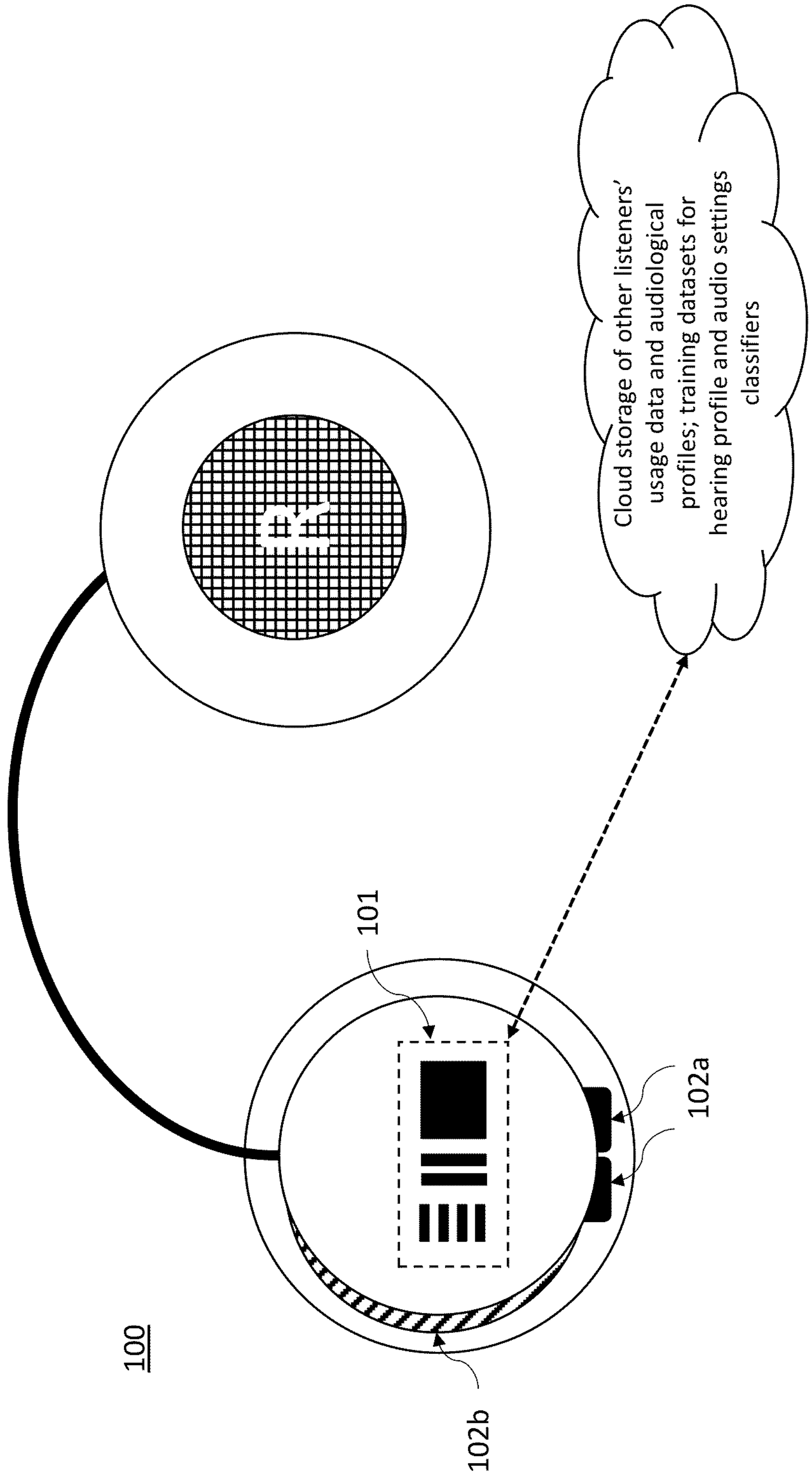
FIG. 1 depicts a schematic diagram of a self-contained headphone capable of processing audiological profiles for sound enhancement and facilitating a self-administered hearing test in accordance to one embodiment of the present invention.

Referring to FIG. 1 for the following description. According to a first aspect of the invention, a self-contained headphone 100 capable of sound enhancement by audiological profiling with integrated self-administered hearing test is provided. In one embodiment, the self-contained headphone 100 comprises one or more processing logic and memory circuitry 101 and a number of user interface elements including buttons 102*a*, sliders 102*b*, and/or dials (on one or both of the earpiece) integrated with the headphone 100 for facilitating a self-administered hearing test during audiological profiling of the subject listener. The self-contained headphone is configured to provide audio playback functions including play-pause control via built-in button press (i.e., combinations of one or more of short and long presses on one or more of the buttons 102*a*), track change control via built-in button press (i.e., combinations of one or more of short and long presses on one or more of the buttons 102*a*), volume control via built-in slider/dial turning (i.e., sliding upward on the left earpiece slider 102*b* for volume increase and sliding downward on the same for volume decrease), equalizer control via built-in button presses and slider/dial turning, and adjustable degrees of noise-cancellation via slider/dial turning (i.e., sliding upward on the right earpiece slider 102*b* for more noise-cancelling and sliding downward on the same for less noise-cancelling).

In one embodiment, the self-contained headphone 100 is further configured via the processing logic and memory circuitry 101 for the storage and retrieval of audiological profiles. Calibration of the self-contained headphone 100 is also conducted automatically during audiological profiling. Due to the nature of structural form of the headphone and the close proximity between transducers and ears, sound-proofing is inherently good and effect of environmental noise is minimized. Also due to the integrated sound enhancement circuitry and the transducers in the self-contained headphones, effect of varying frequency responses in the circuitry and transducer is also minimized.

In one implementation of the self-contained headphone 100, the self-administered hearing test and calibration of the self-contained headphone 100 comprises: initiating the hearing test by the listener pressing a combination of button presses of the self-contained headphone 100; causing one of transducers (one of the earpieces) of the headphone 100 to playback for only one ear a test sound of one of a plurality of test audiometric frequencies to the listener with progressively loud volume from an extreme low volume; causing the transducers of the headphone 100 to playback a voice instruction audio clip instructing the listener to respond via the user interface (i.e., a button press on one of the buttons 102*a*) once the test sound is audible to the listener; repeating the test sound playback and the listener's response receipt for each of the test audiometric frequencies and for each ear to generate a test result of listener's audible level at each of the test audiometric frequencies for each ear; retrieving information on the audio signal generation circuitry path (which can be pre-configured and stored in the memory of the headphone 100 during manufacturing) and the listening condition (the ambience noise of which can be detected using a built-in microphone of the headphone 100); and generating an audiological profile comprising one or more gain and attenuation levels each for each of the test audiometric frequencies based on the test result and the information on the audio signal generation circuitry path and the listening condition.

In one embodiment, the generated audiological profile may be stored locally in the processing logic and memory circuitry 101. In another embodiment, the generated audiological profile may be stored in a separate computing device (i.e., a smartphone, a Cloud database, etc.), and in this case, the data communication of the audiological profile storage and retrieval is facilitated via the processing logic and memory circuitry 101, which further includes the wireless data communication module.

Figure 2:
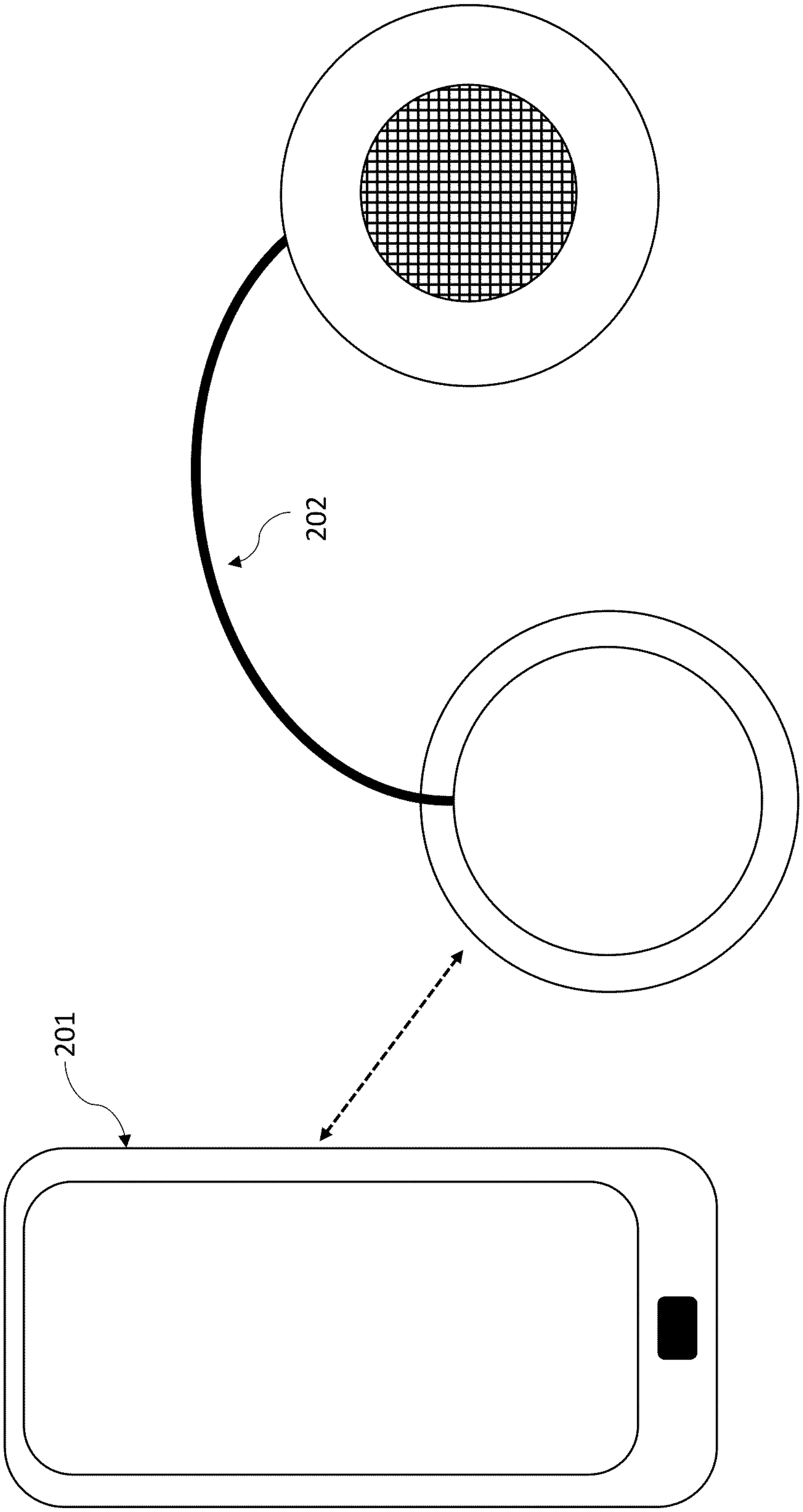
FIG. 2 depicts a logical block diagram of a specially-configured computing device capable of processing audiological profiles for sound enhancement and facilitating a self-administered hearing test in accordance to one embodiment of the present invention.

Referring to FIG. 2 for the following description. According to a second aspect of the present invention, portions or the entirety of the aforementioned functionalities of sound enhancement and self-administered hearing test are provided by a specially-configured computing device 201 (i.e., a smartphone running an app executing the machine instructions implementing the functionalities of sound enhancement and self-administered hearing test) in place of the self-contained headphone 100. In such case, the specially-configured computing device 201 is to electrically couple (wired or wirelessly) with one or more headphones/speakers and/or other transducer components 202 for audio signal generation.

In one embodiment, the headphones/speakers and/or other transducer components 202 may be of any make and model. The calibration of the entire audio signal generation circuitry path and the self-administered hearing test can then be conducted using the specially-configured computing device 201 executing the machine instructions implementing the calibration and self-administered hearing test such as a smartphone with a specially configured app or peripheral equipment. The specially-configured computing device 201 further comprises a user interface for facilitating the calibration and the self-administered hearing test to generate an audiological profile for the listener with the audio signal generation circuitry path, which is the combination of the specially-configured computing device 201 and the particular headphones/speakers and/or other transducer components 202 coupled to the specially-configured computing device 201. The specially-configured computing device 201 then performs the sound enhancement on an input audio signal according to the generated audiological profile to generate a modified audio signal for the listener.

Figure 3:
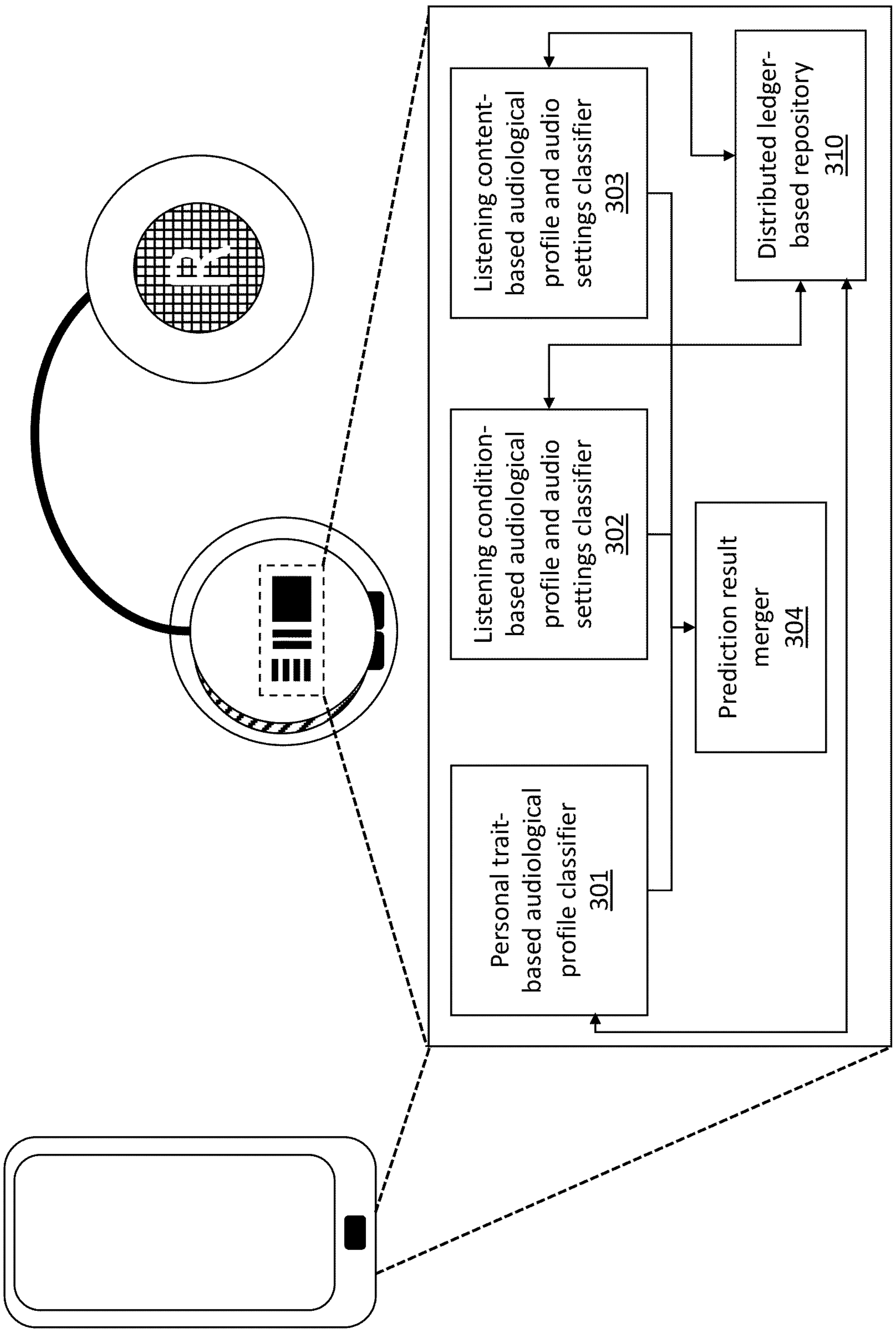
FIG. 3 depicts a logical block diagram of the audiological profile and audio settings classifiers in accordance to one embodiment of the present invention.

Referring to FIG. 3 for the following description. According to a third aspect of the present invention, provided is a personal trait-based audiological profile classifier 301 that may be implemented by one or more of neural networks that are commercially available (i.e., a Convolutional neural network (CNN), a Recurrent neural network (RNN), etc.) The personal trait-based audiological profile classifier 301 is configured to learn from labelled training data comprising records of a plurality of listeners' personal trait features including, but not limited to, age, gender, profession, education level, lifestyle, health condition; and their corresponding audiological profile data.

In one embodiment, the training data may be collected from the community of users of the self-contained headphones. In another embodiment, where a community of large number of users of the self-contained headphones may not be available or accessible, the training data may be collected from user groups of other audio devices capable of creating, using, and storing audiological profiles.

The trained personal trait-based audiological profile classifier 301 is to classify a new listener, based on her personal traits provided to the personal trait-based audiological profile classifier 301 in a request, and create or recommend an audiological profile (prediction result) without the need of the self-administered hearing test. The personal trait-based audiological profile classifier 301 then responds to the requestor (i.e., the self-contained headphone or an audio device) the created/recommended audiological profile for the new listener.

In accordance with one implementation, the personal trait-based audiological profile classifier 301 is executed by the processor of the self-contained headphone, or a separate processor associated with an audio device capable of processing audiological profile for sound enhancement such as a smartphone with a specially configured app or peripheral equipment. In another implementation, the personal trait-based audiological profile classifier 301 is executed by a processor of a remote computing device accessible by the self-contained headphone and other audio devices capable of processing audiological profile for sound enhancement.

In accordance with one embodiment, the personal trait features and audiological profile data are stored in distributed ledger-based repositories 310, which may reside in the memories and be maintained by the processors of the self-contained headphones of the listeners (i.e., acting as nodes in a Blockchain infrastructure). As such, the personal trait-based audiological profile classifier 301 is configured to access the personal trait features and audiological profile data of users of the self-contained headphones as training data under secured distributed computing data exchange protocols (i.e., Blockchain protocols). In another embodiment, the personal trait features and audiological profile data are stored in a specially-configured computing device (i.e., a database server) accessible by the personal trait-based audiological profile classifiers 301 of the self-contained headphones and/or other audio devices capable of processing audiological profile for sound enhancement.

According to a fourth aspect, provided is a listening condition-based audiological profile classifier 302 that may be implemented by one or more of neural networks. The listening condition-based audiological profile and audio settings classifier 302 is configured to learn from labelled training data comprising records of a plurality of various listening condition features including, but not limited to, ambience noise levels; the corresponding environment types (i.e., on heavily travelled street, inside a moving passenger vehicle, in a windy open outdoor space, inside an indoor room hosting multiple conversations, in an underground train cabin, in an airplane cabin, etc.); the corresponding time and location data of when and where the listening conditions are collected; the corresponding listeners' audio settings including, but not limited to, playback volume, equalizer settings, noise-cancellation level; the corresponding listeners' selections of audiological profile.

Similar to that of the personal trait-based audiological profile classifier 301, in one embodiment, the training data for the listening condition-based audiological profile and audio settings classifier 302 may be collected from the community of users of the self-contained headphones. In another embodiment, where a community of large number of users of the self-contained headphones may not be available or accessible, the training data may be collected from user groups of other audio devices capable of creating, using, and storing audiological profiles, and/or storing audio settings. In yet another embodiment, the listening condition-based audiological profile and audio settings classifier 302 takes the listener's own selections of audiological profile and audio settings in the various listening conditions collected over a period of time as training data.

The trained listening condition-based audiological profile and audio settings classifier 302 is to classify a listening condition during run-time, based on the listener's user input specifying the environmental parameters (i.e., ambience noise level, etc.) or environment type, or by automatic detection of time and location (i.e., utilizing the internal clock or a time server, and the GPS receiver of the listener's audio device) in a request to the listening condition-based audiological profile and audio settings classifier 302; and create or recommend an audiological profile and the audio settings (prediction result), without the need of the self-administered hearing test. The listening condition-based audiological profile and audio settings classifier 302 then responds to the requestor (i.e., the self-contained headphone or an audio device) the created/recommended audiological profile and audio settings for the new listening condition. As such, with the on-demand continuous responses from the listening condition-based audiological profile and audio settings classifier 302, the self-contained headphone or audio device as the requestor is able to continuously switch the audiological profiles and/or adjust the audio settings accordingly as its listener moves from one listening condition to another during run-time.

In accordance with one implementation, the listening condition-based audiological profile and audio settings classifier 302 is executed by the processor of the self-contained headphone, or a separate processor associated with an audio device capable of processing audiological profile for sound enhancement such as a smartphone with a specially configured app or peripheral equipment. In another implementation, the listening condition-based audiological profile and audio settings classifier 302 is executed by a processor of a remote computing device accessible by the self-contained headphone and other audio devices capable of processing audiological profile for sound enhancement.

In accordance with one embodiment, the listening condition features, audiological profile, and audio settings data are stored in the distributed ledger-based repositories 310 (i.e., nodes in a Blockchain infrastructure). As such, the listening condition-based audiological and audio settings profile classifier 302 is configured to access the listening condition features, audiological profile, and audio settings data of users of the self-contained headphones as training data under secured distributed computing data exchange protocols (i.e., Blockchain protocols). In another embodiment, these data are stored in a specially-configured computing device (i.e., a database server) accessible by the listening condition-based audiological profile and audio settings classifiers 302 of the self-contained headphones and/or other audio devices capable of processing audiological profile for sound enhancement.

According to a fifth aspect of the present invention, provided is a listening content-based audiological profile and audio settings classifier 303 that may be implemented by one or more of neural networks. The listening content-based audiological profile and audio settings classifier 303 is configured to learn from labelled training data comprising records of a plurality of various listening content features including, but not limited to, playback track titles, listening content types (i.e., dialogs, music of different genres, motion pictures of different genres and moods of scenes, etc.); the corresponding listeners' audio settings including, but not limited to, playback volume, equalizer settings, noise-cancellation level; and the corresponding listeners' selections of audiological profile.

Similar to that of the listening condition-based audiological profile and audio settings classifier 302, in one embodiment, the training data for the listening content-based audiological profile and audio settings classifier 303 may be collected from the community of users of the self-contained headphones. In another embodiment, where a community of large number of users of the self-contained headphones may not be available or accessible, the training data may be collected from user groups of other audio devices capable of creating, using, and storing audiological profiles, and/or storing audio settings. In yet another embodiment, the listening content-based audiological profile and audio settings classifier 303 takes the listener's own selections of audiological profile and audio settings for the various listening contents collected over a period of time as training data.

The trained listening content-based audiological profile and audio settings classifier 303 is to classify a listening content during run-time, based on the listener's user input specifying the listening content type, or by automatic detection of the listening content types (i.e., via recognition of playback track titles and matching with an information database of tracks and their corresponding types) in a request to the listening content-based audiological profile and audio settings classifier 303; and create or recommend an audiological profile and the audio settings (prediction result), without the need of the self-administered hearing test. The listening content-based audiological profile and audio settings classifier 303 then responds to the requestor (i.e., the self-contained headphone or an audio device) the created/recommended audiological profile and audio settings for the new listening content. As such, with the on-demand continuous responses from the listening content-based audiological profile and audio settings classifier 303, the self-contained headphone or audio device as the requestor is able to continuously switch the audiological profiles and/or adjust the audio settings accordingly as the listening content changes during run-time.

In accordance with one implementation, the listening content-based audiological profile and audio settings classifier 303 is executed by the processor of the self-contained headphone, or a separate processor associated with an audio device capable of processing audiological profile for sound enhancement such as a smartphone with a specially configured app or peripheral equipment. In another implementation, the listening content-based audiological profile and audio settings classifier 303 is executed by a processor of a remote computing device accessible by the self-contained headphone and other audio devices capable of processing audiological profile for sound enhancement.

In accordance with one embodiment, the listening content features, audiological profile, and audio settings data are stored in the distributed ledger-based repositories 310. As such, the listening content-based audiological profile and audio settings classifier 303 is configured to access the listening content features, audiological profile, and audio settings data of users of the self-contained headphones as training data under secured distributed computing data exchange protocols (i.e., Blockchain protocols). In another embodiment, these data are stored in a specially-configured computing device (i.e., a database server) accessible by the listening content-based audiological profile and audio settings classifiers 303 of the self-contained headphones and/or other audio devices capable of processing audiological profile for sound enhancement.

According to a sixth aspect of the present invention, provided is a prediction result merger 304 configured to merge the prediction results from two or more of the personal traits-based audiological profile classifier 301, the listening condition-based audiological profile and audio settings classifier 302, and the listening content-based audiological profile and audio settings classifier 303. In one embodiment, the prediction result merger comprises a weighting sum sub-module for assigning one or more weights to each of the prediction results so to merge the prediction results under a weighted sum mechanism. The merged prediction result then comprises a merged audiological profile and merged audio settings used for the sound enhancement and audio setting configurations of the self-contained headphone and other audio devices capable of processing audiological profile for sound enhancement.

The functional units and modules of the apparatuses, systems, and/or methods in accordance with the embodiments disclosed herein may be implemented using computer processors or electronic circuitries including but not limited to application specific integrated circuits (ASIC), field programmable gate arrays (FPGA), graphical processing units (GPU), microcontrollers, and other programmable logic teaching aids configured or programmed according to the teachings of the present disclosure. Computer instructions or software codes running in the computing teaching aids, computer processors, or programmable logic teaching aids can readily be prepared by practitioners skilled in the software or electronic art based on the teachings of the present disclosure.

The embodiments may include computer storage media, transient and non-transient memory teaching aids having computer instructions or software codes stored therein, which can be used to program or configure the computing teaching aids, computer processors, or electronic circuitries to perform any of the processes of the present invention. The storage media, transient and non-transient memory teaching aids can include, but are not limited to, floppy disks, optical discs, Blu-ray Disc, DVD, CD-ROMs, and magneto-optical disks, ROMs, RAMs, flash memory teaching aids, or any type of media or teaching aids suitable for storing instructions, codes, and/or data.

Each of the functional units and modules in accordance with various embodiments also may be implemented in distributed computing environments and/or Cloud computing environments, wherein the whole or portions of machine instructions are executed in distributed fashion by one or more processing teaching aids interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A self-contained headphone with sound enhancement and integrated hearing profiling, comprising:

one or more processors and one or more user interface elements including one or more of buttons, sliders, and dials integrated with the headphone for facilitating a self-administered hearing test during hearing profiling of a listener and calibration of the self-contained headphones;

a personal trait-based audiological profile classifier, implementable by one or more neural networks, and configured to:

machine-learn from training data comprising records of a plurality of listeners' personal trait features collected by the self-contained headphone or other audio devices, the personal trait features including age, gender, profession, education level, lifestyle, health condition, and the listeners' audiological profiles corresponding to the personal traits;

classify a new listener based on input personal traits; and recommend an audiological profile without the self-administered hearing test;

a listening condition-based audiological profile and audio settings classifier, implementable by one or more neural networks, and configured to:

machine-learn from training data comprising records of a plurality of listening condition features collected by the self-contained headphone or other audio devices, the listening condition features including ambience noise levels, corresponding environment types, corresponding time and location data of when and where the listening conditions are collected, corresponding listeners' audio settings comprising one or more of playback volume, equalizer settings, noise-cancellation level, and corresponding listeners' selections of audiological profile;

classify a run-time listening condition; and recommend an audiological profile and audio settings without the self-administered hearing test;

a listening content-based audiological profile and audio settings classifier, implementable by one or more neural networks, and configured to:

machine-learn from training data comprising records of a plurality of listening content features collected by the self-contained headphone or other audio devices, the listening content features including playback track titles, listening content types, corresponding listeners' audio settings comprising one or more of playback volume, equalizer settings, noise-cancellation level, and corresponding listeners' selections of audiological profile;

classify a run-time listening content; and recommend an audiological profile and audio settings without the self-administered hearing test; and a prediction result merger configured to:

merge the recommended audiological profile recommended by the personal trait-based audiological profile classifier, the recommended audiological profile recommended by the listening condition-based audiological profile and audio settings classifier, and the recommended audiological profile recommended by the listening content-based audiological profile and audio settings classifier to generate a merged audiological profile for the sound enhancement; and merge the recommended audio settings recommended by the listening condition-based audiological profile and audio settings classifier and the recommended audio settings recommended by the listening content-based audiological profile and audio settings classifier to generate merged audio settings for configuring the self-contained headphone's audio settings.

2. The self-contained headphone of claim 1, wherein the user interface elements are configured to allow the listener's controls of audio playback, playback volume, equalizer settings, noise-cancellation level, and selections of audiological profiles.

3. The self-contained headphone of claim 1, further comprising:

a local memory component for storage and retrieval of one or more audiological profiles;

wherein the processors and user interface elements are further configured to provide the self-administered hearing test to the listener and generate the audiological profiles to be stored in the local memory component.

4. The self-contained headphone of claim 3, wherein the self-administered hearing test being executed by the processors of the self-contained headphone, the self-administered hearing test comprises:

causing one of transducers of the self-contained headphone to playback for only one ear a test sound of one of a plurality of test audiometric frequencies to the listener with progressively loud volume from an extreme low volume;

causing the transducers of the self-contained headphone to playback a voice instruction audio clip instructing the listener to respond using the user interface elements once the test sound is audible to the listener;

repeating the test sound playback and the listener's response receipt for each of the test audiometric frequencies and for each ear to generate a test result of listener's audible level at each of the test audiometric frequencies for each ear;

retrieving information on audio signal generation circuitry path of the self-contained headphone and listening condition; and generating an audiological profile comprising one or more gain and attenuation levels each for each of the test audiometric frequencies based on the test result and the information on the audio signal generation circuitry path and the listening condition.

5. The self-contained headphone of claim 3, where the local memory component comprises a distributed-ledger-based repository for storing the audiological profiles.

6. The self-contained headphone of claim 1, further comprising:

a data communication component for storage and retrieval of one or more audiological profiles to and from a separate computing device.

7. An apparatus for providing sound enhancement by audiological profiling, comprising:

one or more processors and a user interface for facilitating a self-administered hearing test during hearing profiling of a listener and calibration of an audio signal generation circuitry path;

a personal trait-based audiological profile classifier, implementable by one or more neural networks, and configured to:

machine-learn from training data comprising records of a plurality of listeners' personal trait features collected by the self-contained headphone or other audio devices, the personal trait features including age, gender, profession, education level, lifestyle, health condition, and the listeners' audiological profiles corresponding to the personal traits;

classify a new listener based on input personal traits; and recommend an audiological profile without the self-administered hearing test;

a listening condition-based audiological profile and audio settings classifier, implementable by one or more neural networks, and configured to:

machine-learn from training data comprising records of a plurality of listening condition features collected by the self-contained headphone or other audio devices, the listening condition features including ambience noise levels, corresponding environment types, corresponding time and location data of when and where the listening conditions are collected, corresponding listeners' audio settings comprising one or more of playback volume, equalizer settings, noise-cancellation level, and corresponding listeners' selections of audiological profile;

classify a run-time listening condition; and recommend an audiological profile and audio settings without the self-administered hearing test;

a listening content-based audiological profile and audio settings classifier, implementable by one or more neural networks, and configured to:

machine-learn from training data comprising records of a plurality of listening content features collected by the self-contained headphone or other audio devices, the listening content features including playback track titles, listening content types, corresponding listeners' audio settings comprising one or more of playback volume, equalizer settings, noise-cancellation level, and corresponding listeners' selections of audiological profile;

classify a run-time listening content; and recommend an audiological profile and audio settings without the self-administered hearing test; and a prediction result merger configured to:

merge the recommended audiological profile recommended by the personal trait-based audiological profile classifier, the recommended audiological profile recommended by the listening condition-based audiological profile and audio settings classifier, and the recommended audiological profile recommended by the listening content-based audiological profile and audio settings classifier to generate a merged audiological profile for the sound enhancement; and merge the recommended audio settings recommended by the listening condition-based audiological profile and audio settings classifier and the recommended audio settings recommended by the listening content-based audiological profile and audio settings classifier to generate merged audio settings for configuring the audio signal generation circuitry path's audio settings;

wherein the apparatus is configured to couple with a headphone or speaker of any make and model and provide the sound enhancement on an input audio signal according to an audiological profile to generate a modified audio signal specific to the audio signal generation circuitry path that includes the headphone or speaker.

8. The apparatus of claim 7, further comprising:

a local memory component for storage and retrieval of one or more audiological profiles.

9. The apparatus of claim 7, wherein the self-administered hearing test comprises:

causing one of transducers of the coupled headphone or speaker to playback for only one ear a test sound of one of a plurality of test audiometric frequencies to the listener with progressively loud volume from an extreme low volume;

causing the transducers of the coupled headphone or speaker to playback a voice instruction audio clip instructing the listener to respond using the user interface once the test sound is audible to the listener;

repeating the test sound playback and the listener's response receipt for each of the test audiometric frequencies and for each ear to generate a test result of listener's audible level at each of the test audiometric frequencies for each ear;

retrieving information on the audio signal generation circuitry path and listening condition; and generating an audiological profile comprising one or more gain and attenuation levels each for each of the test audiometric frequencies based on the test result and the information on the audio signal generation circuitry path and the listening condition.

10. The apparatus of claim 8, where the local memory component comprises a distributed-ledger-based repository for storing the audiological profiles.

11. The apparatus of claim 7, further comprising:

a data communication component for storage and retrieval of one or more audiological profiles to and from a separate computing device.

* * * * *